March 15, 1932.  E. R. GURNEY  1,849,872
ENGINE HOOD CONSTRUCTION
Filed June 2, 1931
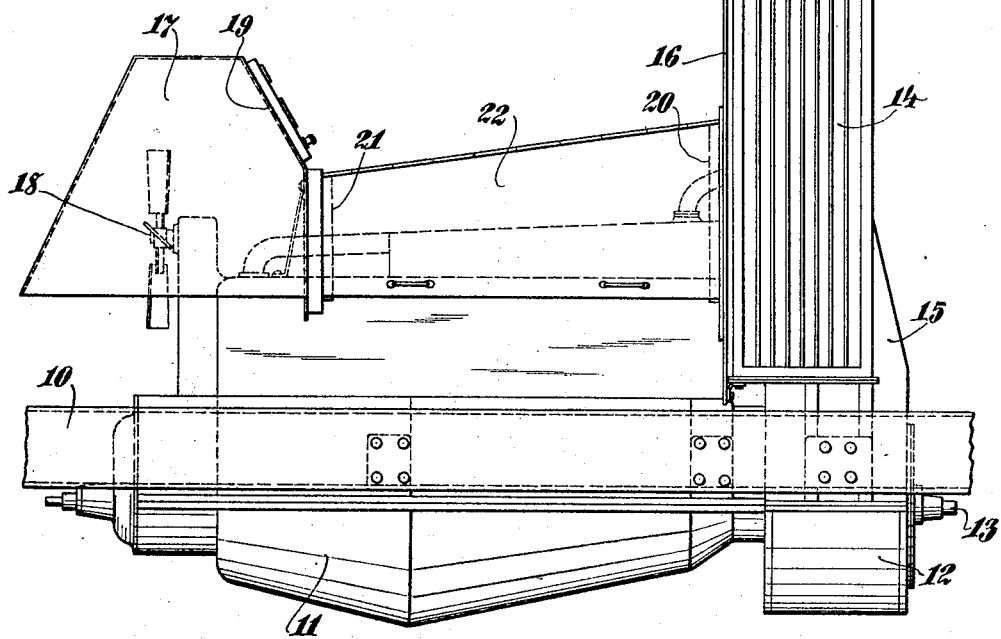
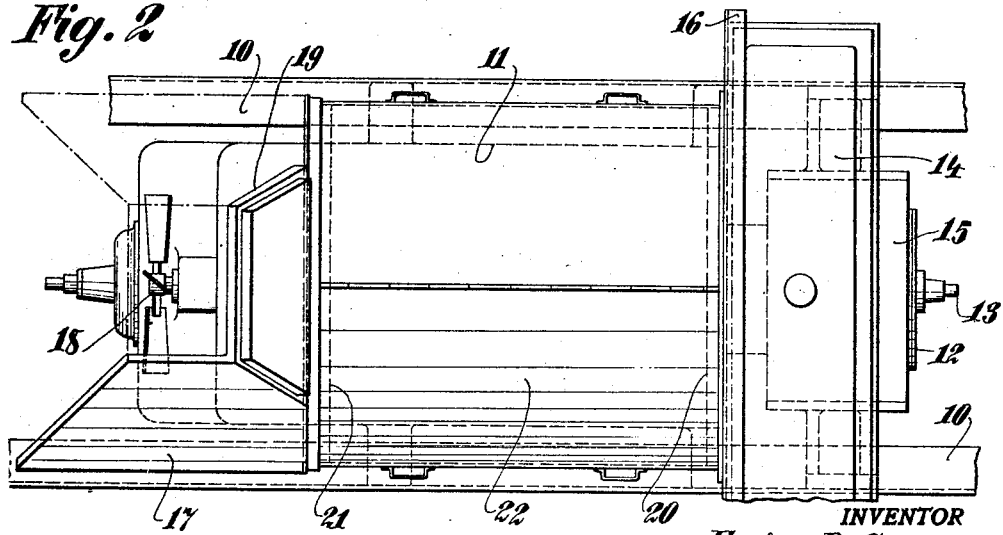
INVENTOR
Erving R. Gurney,
BY
Redding, Greeley, O'Shea & Campbell
HIS ATTORNEYS Patented Mar. 15, 1932

1,849,872

UNITED STATES PATENT OFFICE

ERVING R. GURNEY, OF ALLENTOWN, PENNSYLVANIA, ASSIGNOR TO INTERNATIONAL MOTOR COMPANY, OF NEW YORK, N. Y., A CORPORATION OF DELAWARE

ENGINE HOOD CONSTRUCTION

Application filed June 2, 1931. Serial No. 541,725.

The present invention relates to cooling systems for internal combustion engines and embodies, more specifically, an improved engine hood construction which is adapted to afford convenient access to the engine where the same is mounted within an enclosed cab. More particularly, the invention embodies a device of the above character in combination with a cooling system, wherein the cooling water of the engine is cooled in radiators rearwardly thereof as in standard practice and the external surface of the engine is cooled by a flow of air created by a frontal fan and directed over such surface and between the same and a removable hood construction in accordance with the present invention.

An object of the invention, accordingly, is to provide an engine of the above character wherein the engine cooling fluid is directed through side radiators rearwardly thereof by a squirrel cage fan on the transmission shaft and wherein an improved hood construction is provided for enclosing the engine and permitting a chamber to be formed therearound through which cooling air is directed by means of a frontal fan.

A further object of the invention is to provide a device of the above character, wherein a power unit is provided with side radiators rearwardly thereof and a dash forwardly thereof, the region between the radiators and dash including a housing which completely encloses the engine and reduces the radiation therefrom into the region surrounding the same. In this connection a frontal fan is utilized to direct cooling air within the housing and over the engine.

Further objects of the invention, not specifically enumerated above, will be apparent as the invention is described in greater detail in connection with the accompanying drawings, wherein:

Figure 1 is a view in side elevation showing a power unit constructed in accordance with the present invention and provided with side radiators rearwardly thereof, a dash forwardly thereof, a hood enclosing the engine between the dash and radiators, and suitable fans to direct cooling air through the radiators and rearwardly through the housing.

Figure 2 is a plan view of the power unit shown in Figure 1.

Referring to the above drawings, side frame members of a motor vehicle chassis are indicated at 10 and carry an engine indicated generally at 11. A squirrel cage fan 12 is driven by the transmission shaft 13 of the engine and side radiators 14 are mounted upon the unit to receive cooling air from the squirrel cage fan 12 through suitable ducts 15. A rear dash 16 separates the radiators 14 from the region around the engine and forwardly of the radiators.

Forwardly of the engine, a housing 17 is formed, within which a frontal fan 18 is mounted, this fan being driven by the engine in any suitable fashion. The housing 17 is formed with a forward dash 19 upon which control instruments may be mounted and the forward and rear dashes 16 and 19 are provided with mounting flanges 20 and 21, respectively, upon which a hood 22 is received. The hood and housing 17 may terminate at any desired point where they may cooperate with suitable partitions to complete the closure of the engine.

It will thus be seen that the usual cooling system will be provided for the engine wherein its cooling fluid will be circulated through the radiators 14 and cooled by means of air directed through the radiators by the squirrel cage fan within the housing 12. The frontal fan 18 directs a flow of air rearwardly through the housing 17 and between the hood 22 and engine 11, discharging the same rearwardly either through the radiators 14 or upwardly without passing therethrough. In this fashion, radiation of heat from the engine beyond the hood 22 will not be objectionable and an effective hood installation will thus be provided.

While the invention has been described with specific reference to the accompanying drawings, it is not to be limited, save as defined in the appended claims.

I claim as my invention:

1. In combination with an engine having side radiators mounted rearwardly thereof and means to direct air therethrough, a front dash, a rear dash, a hood between the dashes and enclosing the engine, and a frontal fan driven by the engine and directing air rearwardly over the engine and between the engine and hood.

2. In combination with an engine having side radiators mounted rearwardly thereof and driving a fan to direct air therethrough, a front dash, a rear dash, a hood between the dashes and enclosing the engine, said hood being removably carried by the dashes, and a frontal fan driven by the engine and directing air rearwardly over the engine and between the engine and hood.

3. In combination with an engine having side radiators mounted rearwardly thereof and driving a fan to direct air therethrough, a front housing carrying a dash, a rear dash, a hood between the dashes and enclosing the engine, and a frontal fan mounted in the front housing and driven by the engine and directing air rearwardly over the engine and between the engine and the hood.

This specification signed this 25th day of May, A. D. 1931.

ERVING R. GURNEY.